United States Patent [19]
Ishikawa et al.

[11] Patent Number: 5,636,218
[45] Date of Patent: Jun. 3, 1997

[54] GATEWAY SYSTEM THAT RELAYS DATA VIA A PBX TO A COMPUTER CONNECTED TO A POTS AND A COMPUTER CONNECTED TO AN EXTENSION TELEPHONE AND A LAN AND A METHOD FOR CONTROLLING SAME

[75] Inventors: Katsuya Ishikawa, Zama; Seita Iida, Yokohama, both of Japan

[73] Assignee: International Business Machines Corporation, Armonk, N.Y.

[21] Appl. No.: 544,224

[22] Filed: Oct. 17, 1995

[30] Foreign Application Priority Data

Dec. 7, 1994 [JP] Japan .................... 6-303504

[51] Int. Cl.⁶ ..................... H04L 12/46; H04L 12/56
[52] U.S. Cl. ..................... 370/401; 370/260
[58] Field of Search ................... 370/58.2, 60, 60.1, 370/62, 68.1, 85.13, 85.14, 92, 94.1, 94.2, 94.3, 110.1, 112; 379/93, 94, 96, 202, 231, 234

[56] References Cited

U.S. PATENT DOCUMENTS

| | | | |
|---|---|---|---|
| 5,355,365 | 10/1994 | Bhat et al. | 370/85.13 |
| 5,483,588 | 1/1996 | Eaton et al. | 379/202 |
| 5,519,705 | 5/1996 | Fukutomi | 370/85.13 |
| 5,526,354 | 6/1996 | Barraclough et al. | 370/62 |

*Primary Examiner*—Hassan Kizou
*Attorney, Agent, or Firm*—Anthony N. Magistrale

[57] ABSTRACT

Disclosed is a gateway system and method for controlling same which allows a video conference to be held with a participant (node) being on a plain old telephone system by using a conventional private telephone system and a LAN. The gateway system relays data, via a private branch exchange, to an information processing unit that is on an external plain old telephone system, and an information processing unit that is connected to an extension telephone and a LAN. The system includes a modem for receiving a call from, or transmitting a call to, the plain old telephone system, and for modulating and demodulating a signal. A multiplexer/demultiplexer is used to multiplex voice information and computer data to prepare a packet, or demultiplex a packet to acquire voice data and computer data separately. A LAN adaptor is used for transmitting and receiving computer data via the LAN. A dialer is provided for making a call to an extension telephone and a digital signal processor is used for coding and decoding voice data. An AD/DA converter is provided for performing analog-to-digital or digital-to-analog conversion on the voice data.

5 Claims, 9 Drawing Sheets

GATEWAY SYSTEM THAT RELAYS DATA VIA A PBX TO A COMPUTER CONNECTED TO A POTS AND A COMPUTER CONNECTED TO AN EXTENSION TELEPHONE AND A LAN AND A METHOD FOR CONTROLLING SAME

BACKGROUND OF THE INVENTION

1. Field of the Invention

The present invention relates to a gateway system and a gateway method for line connection via a telephone system, and in particular to a gateway system and a gateway method that facilitate the holding of video conferences by using a plain old telephone system. More specifically, the present invention pertains to a gateway system and a gateway method that permit the use of a current PBX and a LAN to provide video conference capabilities for in-house conference participants, or for such participants and other participants outside.

2. Description of Related Art

As a result of current technical improvements, personal computers (PCs) are now in widespread use and are being employed to accomplish a variety of tasks. For example, PCs are now used as a communication tool in much the same way as are telephones. Further, PCs have now advanced beyond the stage where they were simply terminals to be employed for electronic mail and communication, and have become a medium for the transfer of information that involves, such transmission means as sound, videos, and graphics. By connecting PCs together to form a network, and to thus make possible the display of common data (e.g., the faces of the other persons on a line, drawings, and photographs) while the individuals on the line converse by means of the microphones and loudspeakers that are hooked up to the PCs, the remote conference (or video conference) capability is enabled.

There are several forms by which the PCs can be linked. As an example, an Integrated Services Digital Network (ISDN) is employed as a data transfer medium. The ISDN is a network, for the transmission of digital data, in which two channels, a voice transmission channel and a data transmission channel, are logically assigned to one communication line. The ISDN handles not only voice telephone transmission, but can also generally handle so-called multimedia, such as text, data, static images, and motion video images. It is possible to construct a video conference system by connecting a number of PCs to one ISDN. Considering the rate at which ISDNs are being installed (considering especially the in-house provision of ISDNs), however, an investment for new equipment may be required and may not be an optimal solution.

As another form for the linking of PCs, it is possible to transfer both voice data and computer data over a Local Area Network (LAN). When communication is accomplished by means of a LAN, however, buffering is performed by the PC to hold a predetermined amount of data and the data is then transmitted at one time. Accordingly, the transmission of voice data is also delayed for the time that is equivalent to the buffering period. In other words, real time processing is lost. Since a video conference system especially must transmit an enormous amount of image information data and since the traffic on the line is heavy, voice cutoff is a frequent occurrence.

Another form employed for linking the PCs involves the use of a Plain Old Telephone System (POTS). In this case, modems are attached to the individual PCs, and their physical connection to the POTS is accomplished by inserting a connector, such as an RJ11, into the modem. However, current modems are suitable only for outside telephone lines and not available for use with the extension lines that are internally provided in schools, companies, etc., because the interfaces for the Private Branch Exchanges (PBXs) that controls the connection of private lines vary from maker to maker. Therefore, even in an office that is equipped with extension telephones, (1) participants in an in-house video conference have to bypass a PBX and employ outside telephone lines to connect their PCs, or (2) have to have produced and to employ a modem that matches the in-house PBX. In the former case, although the PCs can be connected by using a commercially available modem, a new outside telephone line must be provided for every participant, even in an office that is equipped with a PBX. The equipment expenditures and the difference in the usage costs between extension telephone lines and outside telephone lines are very high. In the latter case, since a modem for an in-house PBX has to be developed and produced, this is not practical in view of the effort and costs that are involved.

In summary, taking into consideration both telephone system use costs and equipment costs, the employment of the plain old telephone system (POTS) facilitates the implementation of a video conference system at an earlier stage than does the employment of a high-performance ISDN. In this case, however, disadvantages remain.

OBJECTS OF THE INVENTION

It is one object of the present invention to provide a gateway system and a gateway method that employs a plain old telephone system to facilitate the holding of video conferences.

It is another object of the present invention to provide a gateway system and a gateway method that can make possible the holding of low cost video conferences in which there are both in-house participants and outside participants by employing a conventional internal telephone system and a LAN, or for holding such video conferences involving participants who are located in different offices via a plain old telephone system.

SUMMARY OF THE INVENTION

To achieve the above objects, according to a first aspect of the present invention, a gateway system, which relays data, via a private branch exchange, to an outside information processing unit on a plain old telephone system and to an information processing unit that is connected to an internal extension telephone system and a LAN, includes a modem for demodulating or modulating a packet that is received via the plain old telephone system and for transmitting the resultant packet to the plain old telephone system, and for dialing an outside telephone line. Multiplex/demultiplex means are provided for multiplexing voice data and computer data to form a packet, and for demultiplexing a packet to acquire voice data and computer data separately. The system also includes signal processing means for coding or decoding the voice data, AD/DA conversion means for performing digital-analog or analog-digital conversion on the voice data, dial means for dialing an extension line via the private branch exchange and a LAN adaptor for exchanging computer data via the LAN.

According to a second aspect of the present invention, a gateway method, for controlling a gateway system that relays data, via a private branch exchange, to a node A, to which is allocated a first information processing unit that is connected externally to a plain old telephone system, and to a node B, to which is allocated a second information processing unit that is connected internally to an extension telephone system and a LAN, includes the step of receiving a call from node A to the gateway system. Next, a packet that includes identification information for node B is transmitted from node A to the gateway system. The method further includes the steps of acquiring, by the gateway system, an extension telephone number for node B according to the identification information, dialing an extension telephone number for node B by the gateway system and establishing a LAN connection between the gateway system and node B.

According to a third aspect of the present invention, a gateway method, for controlling a gateway system that relays data, via a private branch exchange, to a node A, to which is allocated a first information processing unit that is connected externally to a plain old telephone system, and to a node B, to which is allocated a second information processing unit that is connected internally to an extension telephone system and a LAN, includes the step of establishing a LAN connection between node B and the gateway system. Next, a packet which includes a telephone number for node A is transmitted from node B to the gateway system. The method further includes dialing, by the gateway system, the telephone number of node A and dialing an extension telephone number for node B by the gateway system.

According to a fourth aspect of the present invention, a gateway method, for controlling a gateway system that relays data, via a private branch exchange, to a node A, to which is allocated a first information processing unit that is connected externally to a plain old telephone system, and to a node B, to which is allocated a second information processing unit that is connected internally to an extension telephone system and a LAN, includes the steps of receiving, via the private branch exchange, a packet that is transmitted to the plain old telephone system by the first information processing unit and demodulating the packet. The resultant packet is then demultiplexed to acquire voice data and computer data separately. The method further includes decoding and converting into an analog signal the voice data, transmitting the analog signal via the private branch exchange to an extension telephone for node B and transmitting the computer data to the second information processing unit that is LAN-connected.

According to a fifth aspect of the present invention, a gateway method, for controlling a gateway system that relays data, via a private branch exchange, to a node A, to which is allocated a first information processing unit connected externally to a plain old telephone system, and to a node B, to which is allocated a second information processing unit connected internally to an extension telephone system and a LAN, includes the step of receiving voice data via the private branch exchange from an extension telephone for the node B. The voice data is then digitized and coded. Next, computer data is received via a LAN from the second information processing unit. The voice data that is coded and the computer data is then multiplexed to prepare a packet. The method further includes modulating and transmitting the packet via the private branch exchange to the first information processing unit.

According to the present invention, a video conference that has outside participants (nodes) that communicate by a public telephone system, such as a POTS, is implemented by employing a conventional in-house telephone system and a LAN. More specifically, according to the present invention, data (packets) that are transmitted via a public telephone system can be demultiplexed to acquire voice data and computer data separately, which can in turn be distributed to corresponding extension telephones and computers. In addition, a packet can be prepared by multiplexing voice data and computer data that are transmitted from an internal node, and the packet can be sent to a node at the other end of a public telephone system.

According to the present invention, simply by the in-house provision of a single gateway system (more exactly, a gateway system or a computer system that implements a gateway method) a video conference system can be implemented that uses conventional equipment, such as a POTS. For example, a PBX need only control the connection of calls according to extension telephone numbers, regardless of the presence of the gateway system. The nodes for individual in-house participants of a conference can take part in a video conference by using their extension telephones and their personal computers that are connected to a LAN. The equipment that is required for the use of outside telephone lines by the individual nodes, or the development of an interface that corresponds to respective the PBXs, is not required.

Other objectives, features, and advantages of the present invention will become apparent in the course of the following detailed explanation of the present invention while referring to the accompanying drawings.

DETAILED DESCRIPTION OF THE INVENTION

1. Network Arrangement for a Video Conference System

Figure 1:
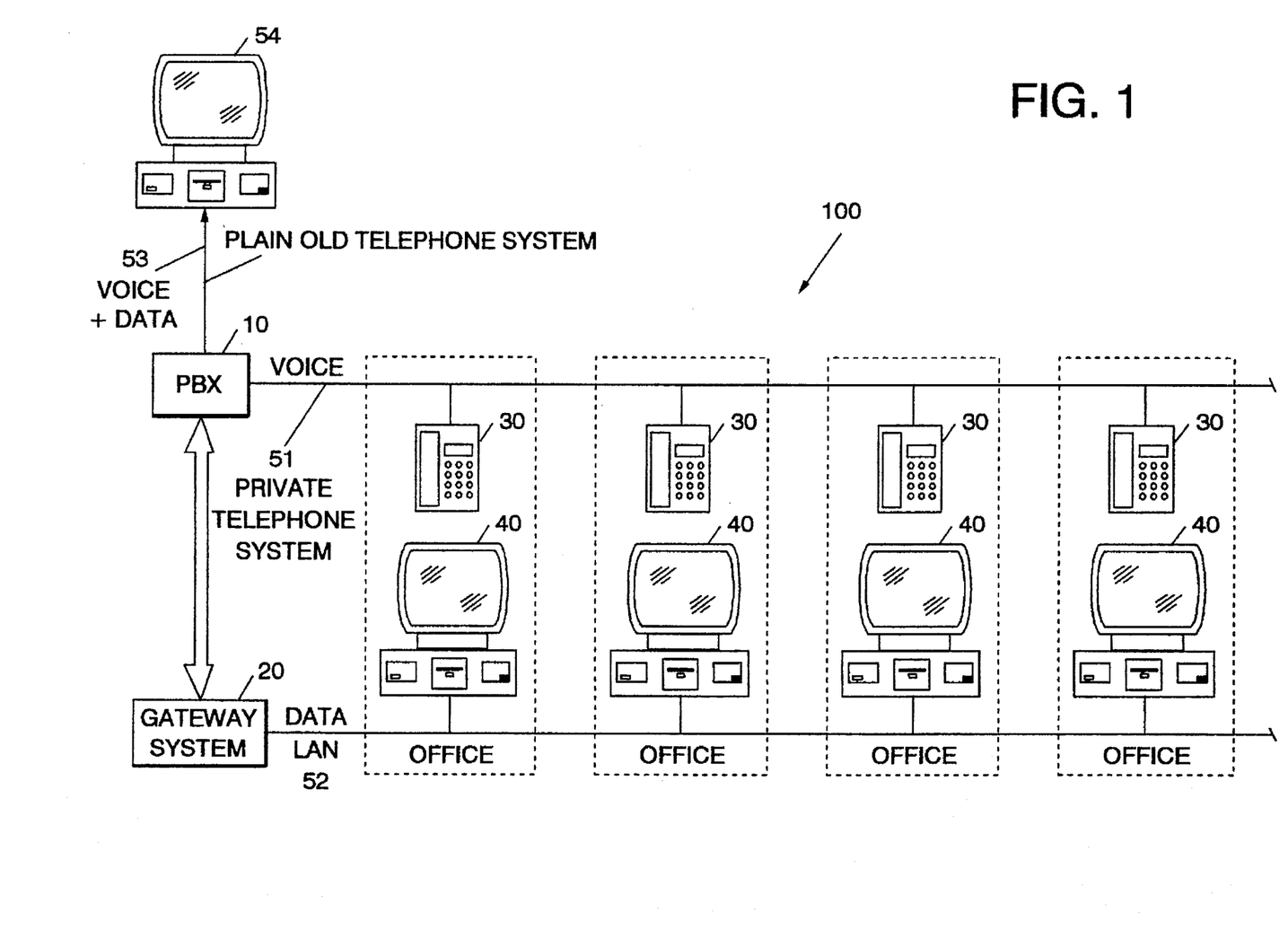
FIG. 1 is a schematic diagram of a video conference system 100 in accordance with the present invention.

A specific network arrangement for a video conference system 100 according to one embodiment of the present invention is shown in FIG. 1. A private telephone system 51 communicates via a private branch exchange (PBX) 10 with an external plain old telephone system (POTS) 53. A LAN 52 communicates, via a gateway system 20, with the PBX 10.

As is well known, the POTS 53 can transfer both coded voice data and coded computer data in the form of an analog signal that is modulated by a modem. The private telephone system 51 transfers only voice data in the form of an analog signal, and the LAN 52 transfers only digitized computer data. The external and internal network topologies of the system 100 can take the shape of either a bus, a star, or a ring.

Multiple extension telephones 30 are connected to the private telephone system 51, and the PBX 10 controls the calling connection according to the extension numbers that are assigned to the individual telephones 30. Multiple personal computers (PCs) 40 are mutually connected via the LAN 52. In the LAN 52, a MAC address is assigned as identification information to each of the PCs 40, and a data transmitting destination can be specified by placing the MAC address at the head of a series of data (also called a "packet") that is to be transmitted. In this embodiment, a single extension telephone 30 and a single PC 40 are provided for a conference participant (a conference participant, to which an extension telephone and a PC are assigned, or his location, is hereafter also called a "node"). Each node can communicate by voice over an individual extension telephone 30 and can use a PC 40 to exchange data via the LAN 52. The system 100 in this embodiment is designed to use a unique node ID to identify each node.

The external public telephone system 53 is a public telephone network of a so-called POTS. An outside telephone line is connected to each terminal and a PC 54 is also connected thereto via a modem. In this embodiment, a conference participant can output voice data via the public telephone system 53 and also has an assigned PC by which to exchange packets via the public telephone system 53 (such a conference participant or his location, is also called a "node"). A node ID is assigned as identification information to each external node as well as to each internal node.

The gateway system 20 assists the connecting operation of the PBX 10 for the private telephone system 51, and distributes computer data to the LAN 52. More specifically, the gateway system 20 demultiplexes a signal that is acquired by mixing voice data and computer data and that is transmitted as packet data from the public telephone system 53. The gateway system 20 then dials the number of a destination extension telephone 30 for the sender node and transmits voice data, while at the same time sending computer data to the LAN 52. For the PBX 10, the gateway system 20 is only one of the extension telephones to which an extension number has been assigned, and therefore, no processing of the communication by the gateway system 20 is required of the PBX 10. The gateway system 20 can be implemented by a single personal computer (described below).

Figure 2:
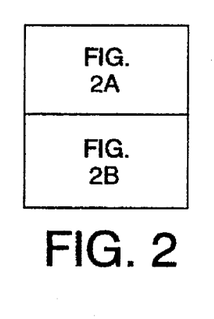
FIG. 2 is a block diagram illustrating inter-computer communication with the system 100 of FIG. 1.
Figure 2A:
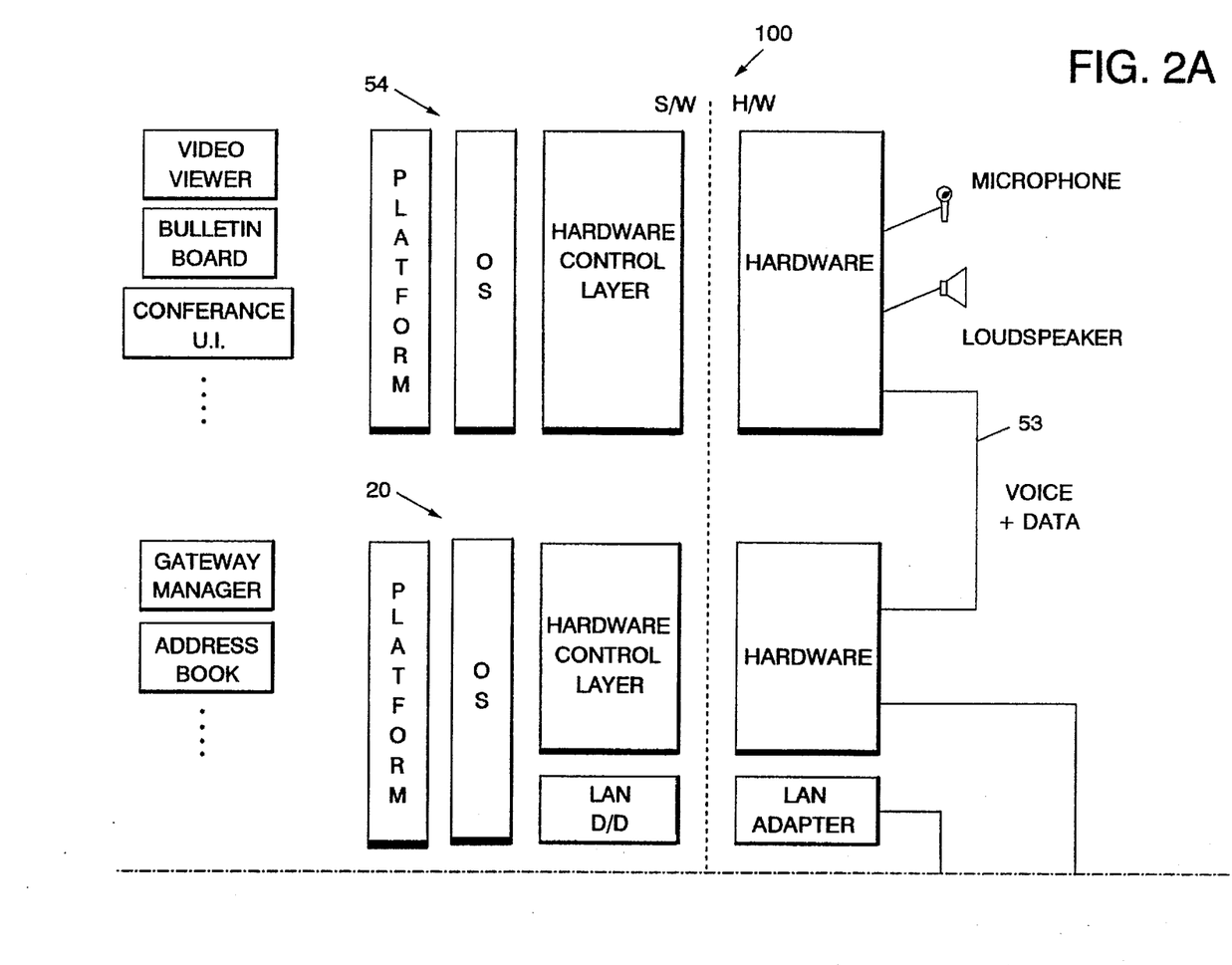
Figure 2B:
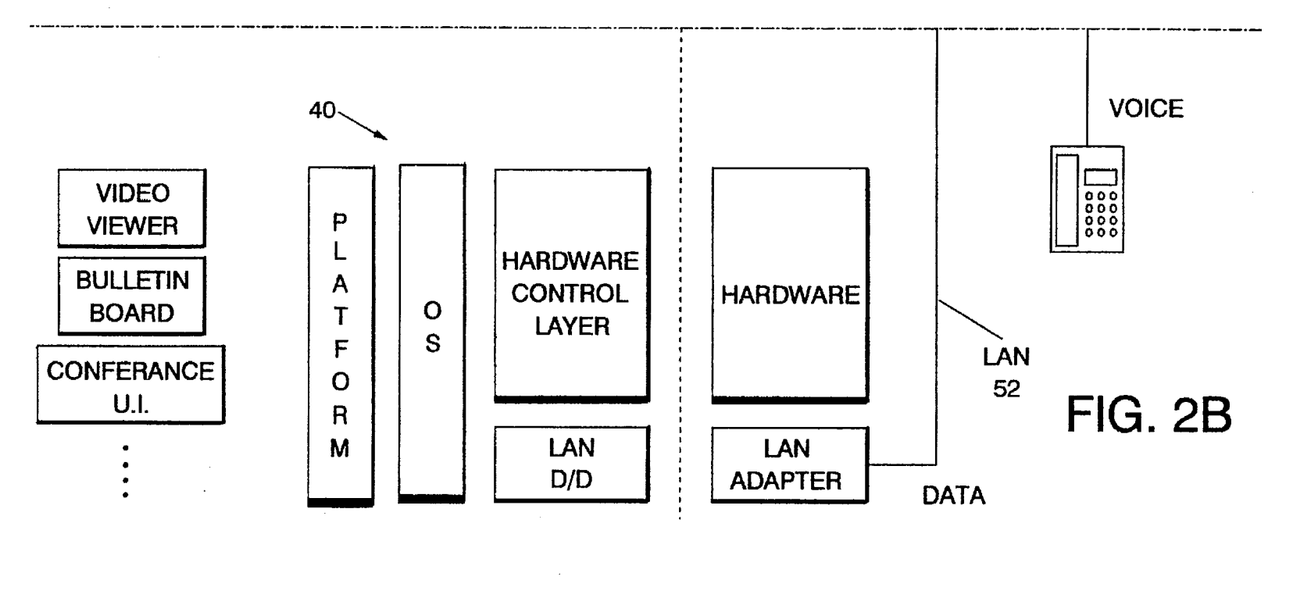

Turning now to FIG. 2, there is shown a network system 100 which can be regarded as a communication system, for communicating between the external PC 54 and the internal PC 40, within which a PC that serves as the gateway system 20 acts as a relay terminal. The PCs 40, 20, and 54 each have a platform layer atop an operating system (OS) (e.g., AIX) that manages the processing performed by the PC. Generally, the platform layer, which is also called a "Collaboration Framework," enables the sharing, between a plurality of nodes, (PCs) of the application software that is being executed. Above the platform layer, various types of application software are loaded. For example, the in-house PCs 40 and the node PC 54 in the public telephone system 53 simultaneously execute application software, such as "Video Viewer," "Chalk Board," "Conference User Interface," that provide a video conference environment for a user.

Here, the Video Viewer captures video information (e.g., the figures of conference participants at their individual nodes) or displays video information from the other node to provide realism. The Chalk Board is a so-called bulletin board and simultaneously displays the same data, such as files, texts, and images that are read by the PCs, on the screens of other node PCs to enable a conference to proceed in real time. The Conference User Interface is employed to provide all the controls for a video conference, and to activate other application software. The data for these software applications are integrated by the platform, and the resultant data are transmitted by the public telephone system 53 or the LAN 52. The PC that serves as the gateway system 20 executes a "gateway manager," which is a software application that performs a relay function between the node PCs, and manages an "address book," which will be described later, that carries identification information for the individual nodes.

The hardware layers for the PCs 40, 20, and 54 have slightly different structures, and their hardware control layers are accordingly different. The PC 54 on the public telephone system 53 includes a device (e.g., a microphone or a loudspeaker) either for inputting or for reproducing voice data, a device for multiplexing/demultiplexing voice data and computer data to enable data exchange via the public telephone system 53, and a modem for physically connecting the PC 54 to the public telephone system 53. The PC that serves as the gateway system 20 communicates with the PC 54 via the PBX 10 (see FIG. 1), and includes a device for demultiplexing data (packet) from the public telephone system 53 to acquire voice data and computer data separately and for distributing this data individually to the extension telephone system 51 and the LAN 52. The in-house node PCs 40 communicate with the gateway system 20 via the LAN 52. The gateway system 20 and the in-house node PCs 40 each have a LAN adaptor card for LAN connection, and a LAN device driver for the hardware operation on the card. The extension telephones 30 of the individual internal nodes communicate with the PC 54 via the PBX 10 and the gateway system 20 (see FIG. 1).

Since a commercially available PC can adequately perform as the PC 54 on the public telephone system 53 and the in-house PCs 40, no further detailed explanation for them will be given in this specification. The PC that functions as the gateway system 20 will be described below.

2. Hardware Arrangement for Gateway System 20

Figure 3:
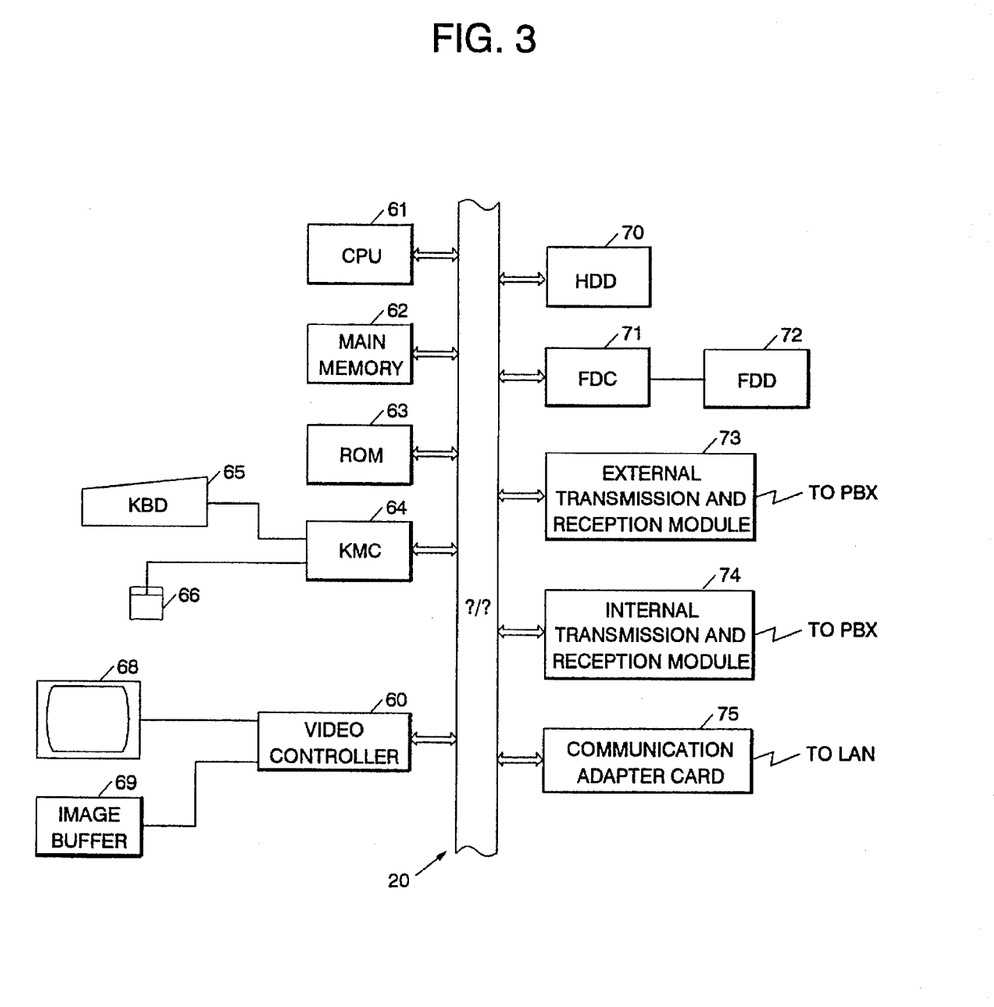
FIG. 3 is a block diagram illustrating the hardware arrangement of a computer system that functions as a gateway system 20 in accordance with the present invention.

FIG. 3 is a schematic diagram illustrating the hardware arrangement for a computer system that functions as the gateway system 20. A CPU 61 that controls all the processing by the gateway system 20 employs a bus to communicate with other hardware components. A main memory 62 is employed as a storage area in which basic software, such as an operating system and application software, are loaded and in which work data for the CPU 61 are temporarily stored. A ROM 63 is employed for permanently storing codes for a procedure that is executed at the time of activation (POST) and a program (BIOS) for hardware control. A keyboard/mouse controller (KMC) 64 is a peripheral controller for processing matrix data that are inputted at a keyboard 65 or coordinates that are input by means of a mouse 66. A video controller 67 is a peripheral controller for actually drawing an image in consonance with a drawing command that is received from the CPU 61. A screen buffer 69 is used to temporarily store image drawing information that is being processed. A display device 68 displays the contents of the screen buffer 69. In addition, a hard disk drive (HDD) 70, a floppy disk controller (FDC) 71 and a floppy disk drive (FDD) 72 are provided as auxiliary storage devices in the gateway system 20.

A computer system actually includes many interface circuits and input/output devices in addition to the components shown in FIG. 3. As this would be understood by one having ordinary skill in the art, a further description of hardware components is omitted for convenience and since it is not needed for the explanation of the present invention.

An external transmission and reception module 73, an internal transmission and reception module 74, and a communication adaptor card 75 are required to enable the computer system 20 to function as a gateway system according to the present invention and to provide the gateway method for the present invention.

Figure 4:
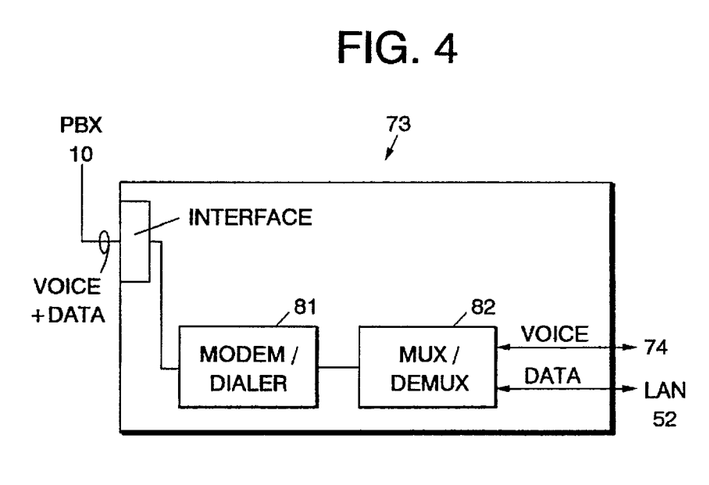
FIG. 4 is a diagram illustrating the internal arrangement of the external transmission and reception module shown in FIG. 3.

The external transmission and reception module 73 is a device that enables the exchange of data with the public telephone system 53 via the PBX 10. FIG. 4 is a schematic diagram showing the external transmission and reception module 73. As is shown in FIG. 4, the external transmission and reception module 73 includes a modem/dialer 81 and a multiplexer/demultiplexer 82. The modem portion of the modem/dialer 81, which is connected to the PBX 10 via a PBX interface, accepts (receives) a call from outside (request for an incoming call), modulates a digital signal for computer processing and transmits the modulated signal to the public telephone system 53, and demodulates a signal from the public telephone system 53. The dialer portion of the modem/dialer 81 is employed to dial a number on an outside telephone line that is positioned at a terminal on the public telephone system 53 or the PC 54.

The multiplexer/demultiplexer 82, which is connected to the private telephone system 51 and the LAN 52, multiplexes voice data on the private telephone system 51 and computer data on the LAN 52 to prepare a packet (described below), and demultiplexes a packet that is transferred from the public telephone system 53 via the PBX 10 to acquire voice data and computer data separately for distribution across the private telephone system 51 and the LAN 52. For multiplexing and demultiplexing a packet, the structure of the packet is converted so that it is adjusted to conform to the specifications for the LAN 52 or the public telephone system 53 respectively. Since this conversion process is well known, no explanation of it will be given.

Figure 5:
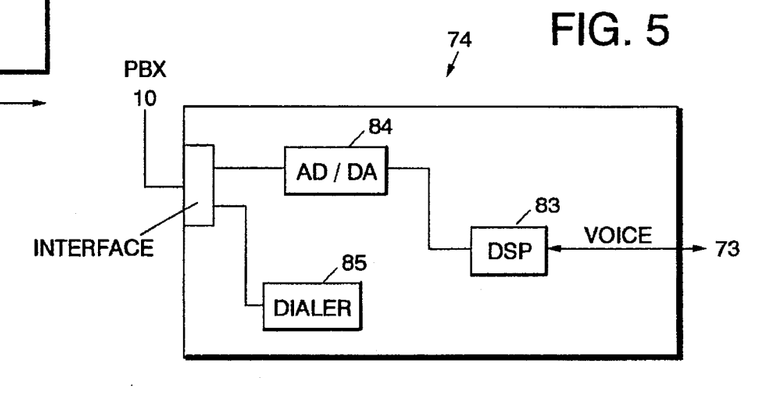
FIG. 5 is a diagram illustrating the internal arrangement of the internal transmission and reception module shown in FIG. 3.

The internal transmission and reception module 74 is a device that enables the exchange of voice data with the extension telephones 30 via the PBX 10. FIG. 5 is a schematic diagram illustrating the internal transmission and reception module 74. As is shown in FIG. 5, the internal transmission and reception module 74 includes a digital signal processor (DSP) 83, an AD/DA converter 84, and a dialer 85. The DSP 83 is a microprocessor that exchanges, via the external transmission and reception module 73, only the voice data that are included in the data that are employed in the communication with the public telephone system 53, and performs the high speed coding/decoding of voice data. A Global System for Mobile Communication (GSM) is employed to code voice data. The AD/DA converter 84 converts an analog signal from the private telephone system 51 into a digital signal, or converts digital voice data from the public telephone system 53 into analog data. The dialer 85, which is connected to the PBX 10 via the PBX interface, receives calls from other extension telephones 30, or dials the numbers of other extension telephones 30.

The communication adaptor card 75, which physically connects the computer system to the LAN 52, enables the transfer of computer data. Such an adaptor card is, for example, an Ethernet adaptor card or a token ring adaptor card, that is commercially available.

3. Software Arrangement of Gateway System 20

Figure 6:
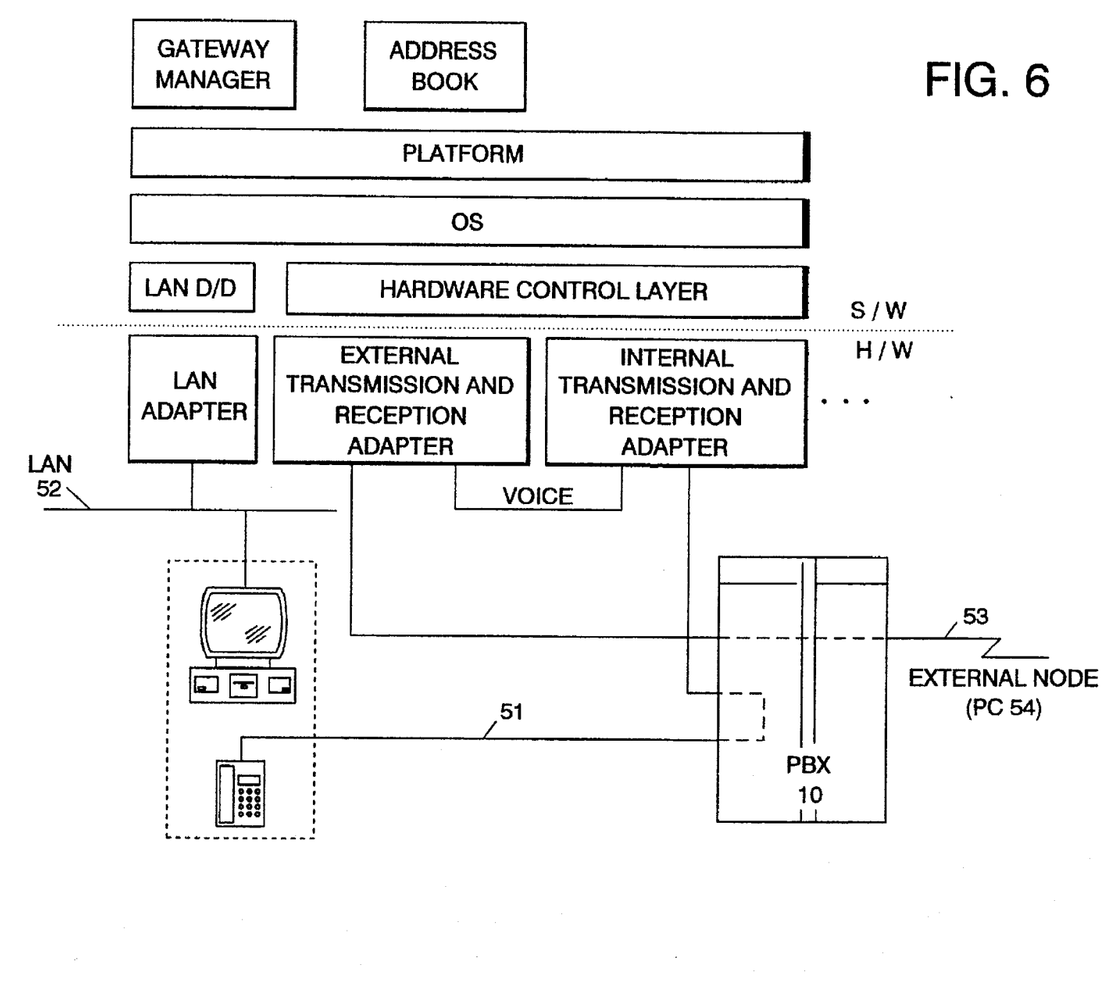
FIG. 6 is a schematic diagram illustrating the software arrangement for a computer system that embodies the gateway system 20.

FIG. 6 is a specific diagram illustrating a hierarchial software system, which controls a PC that implements the gateway system 20, and an interface with a hardware layer. The lowermost layer is a hardware control layer for exchanging data between individual hardware units, and for converting general commands that are issued by the upper software layer into code that controls the operations of the individual hardware units and for transmitting such code. The hardware control layer includes a LAN device driver for operating the LAN adaptor card 75 and codes for operating the internal/external transmission and reception modules 73 and 74.

The operating system (OS) is basic software for controlling hardware resources of the PC 20, such as memory control, input/output control, and task control. AIX, for example, corresponds to such an operating system.

The platform layer, which is also generally called the "Collaboration Framework" as is mentioned above, enables the sharing of application software that is executed by a plurality of node PCs.

The uppermost layer is application software. The PC that is the gateway system 20 loads the "gateway manager" into the main memory 62 and executes it. The gateway manager functions as a relay terminal that connects the internal node PC to the external node PC, and controls the connection of the LAN 52 and the private telephone system 51. More specifically, the gateway manager analyzes the header of a packet and dials the number of the extension telephone 30. Its detailed operation will be described below.

Figure 7:
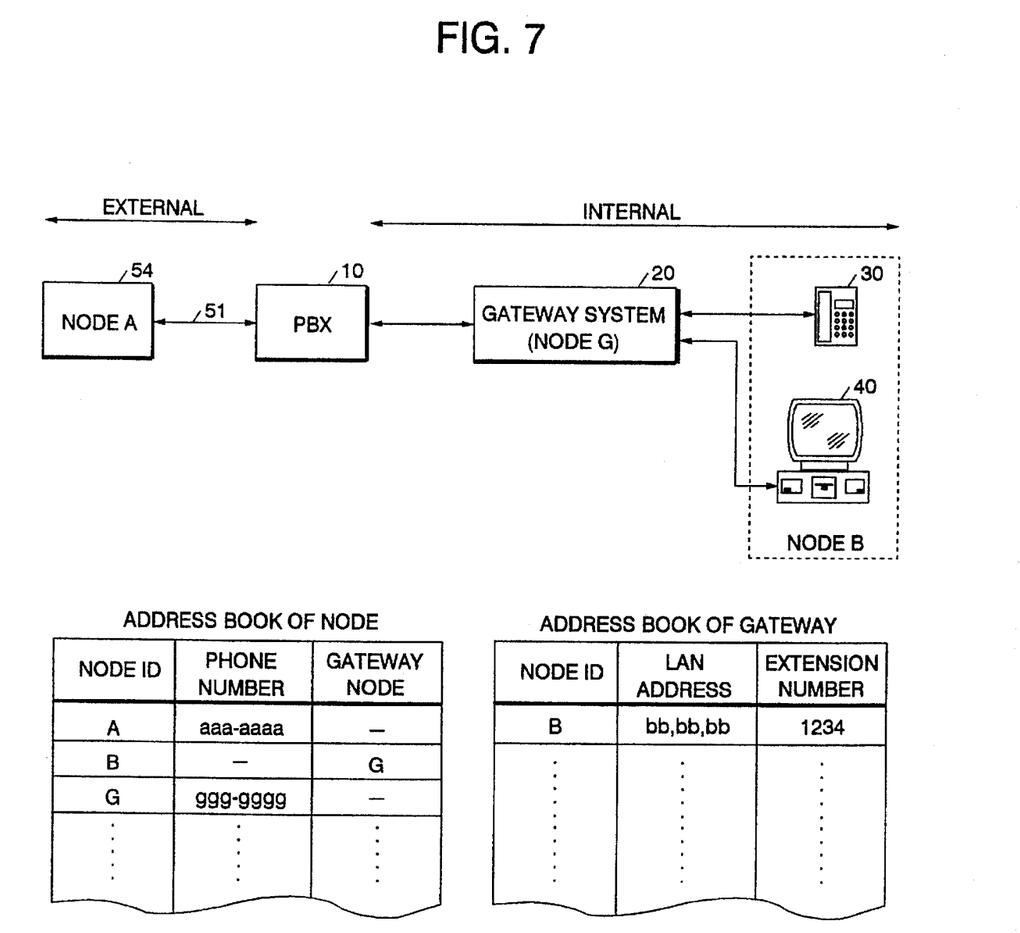
FIG. 7 is a diagram illustrating the data structures for the address books that a gateway manager administrates.

As part of its management function, the gateway manager stores identification information for individual internal nodes in an "address book." In FIG. 7, the data structure of the address book is shown. As is indicated in FIG. 7, the address book prepares a single record for each node ID. The record includes an address (MAC address) on the LAN 52 of a corresponding node and a field for storing an extension number. Since the gateway manager can acquire a MAC address for each internal node by referring to the address book, the gateway manager can effect a LAN connection upon the receipt of an incoming call that originates at the node PC 54 on the public telephone system 53 (which will be described later). It should be understood that the address book is actually stored in a dedicated memory area in the main memory 62. Although each of the internal and external nodes requires the equivalent of an address book to specify a transmission destination, it is immaterial whether or not software is employed to enter the destinations in the memory, or a user manually enters them in an actual address book.

4. Basic Processing for Gateway System 20

Figure 8:
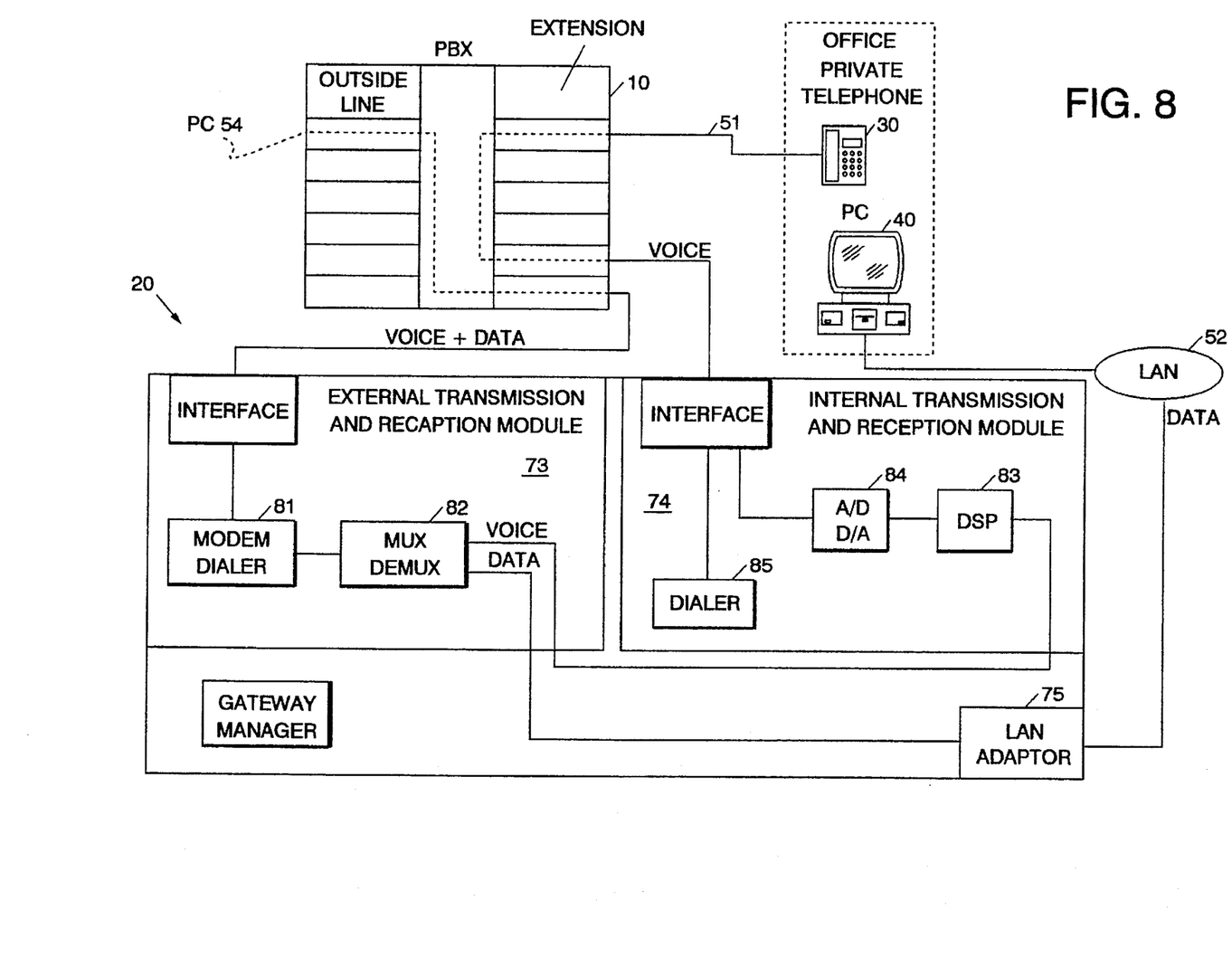
FIG. 8 is a diagram for illustrating a data flow through the gateway system 20.

FIG. 8 is a schematic diagram that includes only some components shown in FIG. 1 and is used to explain the individual data flows along the private telephone system 51 and the LAN 52 via the gateway system 20, and the basic processing for the gateway system 20.

As was previously described, the gateway system 20 communicates with the PBX 10 via the external transmission and reception module 73 and the internal transmission and reception module 74, and can communicate with the in-house PCs 40 along the LAN 52 via the LAN adaptor card 75.

Signals that are transmitted between the PBX 10 and the external transmission and reception module 73 are formed into a packet, in which voice data and computer data are multiplexed, that has a structure that is the equivalent of the one that is transferred in the public telephone system 53. Only analog signals that constitute voice data are transmitted between the PBX 10 and the internal transmission and reception module 74. The gateway system 20 is connected by the LAN 52 to the internal PCs 40 via the individually installed LAN adaptor cards 75, so that computer digital data can be exchanged via the LAN 52.

When the gateway system 20 receives from the external node PC 54 via the PBX 10 a multiplex signal that consists of voice data and computer data, the gateway system 20 demultiplexes the received signal to acquire voice data and computer data separately and then distributes these data to the corresponding extension telephone 30 and the corresponding PC 40 respectively. To do this, first, the modem 81 demodulates a multiplex signal, and the demultiplexer 82 demultiplexes the demodulated signal to acquire voice data and computer data. The DSP 83 performs GSM decoding on the voice data, and the DA converter 84 converts the decoded data into an analog signal, and transmits it as a normal call signal, via the PBX 10, to a corresponding extension telephone 30. The computer data are sent to the LAN 52 via the LAN adaptor card 75. Since the voice data and the computer data are transmitted to internal nodes via independent routes, conversation is not cut off and real time processing is not lost.

On the other hand, for transmitting voice data and computer data from an internal node to the external node PC 54, the gateway system 20 multiplexes voice data and computer data that are transmitted from the extension telephones 30 and the PCs 40 at the internal nodes, and then transmits the resultant data to the public telephone system 53. The voice data that are inputted through the extension telephone 30 are transmitted via the PBX 10. The AD converter 84 converts the voice data into a digital signal and the DSP 83 performs GSM coding on the digital signal. The computer data are transmitted from the PC 40 via the LAN 52. The multiplexer 82 receives both the voice data and the computer data and multiplexes them in a packet having a predetermined bit length (which will be described later). The modem 81 modulates the packet and transmits the modulated packet via the PBX 10 to the public telephone system 10.

The data distribution via the gateway system 20 is based on the premise that the connection of the LAN and the telephone system is established by the gateway system 20. The operation for the telephone system connection will be described below.

5. Packet Structure

Digital data that are exchanged, via the PBX 10, by the external node PC 54 and the external transmission and reception module 73 of the gateway system 20 are prepared in a data format, with a header, that is called a "packet." The structure of a packet employed in this embodiment will be described in this article.

One packet consists of 288 bits, which is equivalent to the amount of data that is transmitted in 20 msec when a modem of 14.4 kbps is used. The structure of a packet is classified into two types, according to whether or not it includes voice data.

Figure 9:
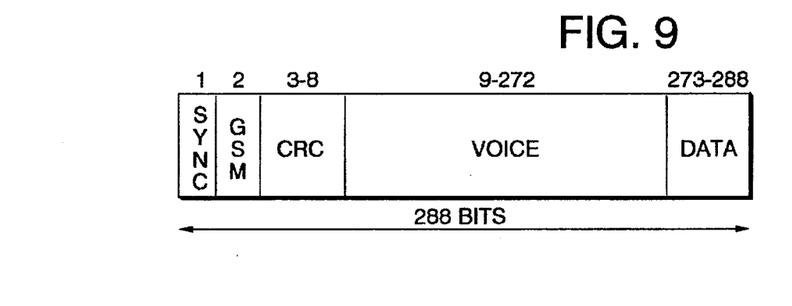
FIG. 9 is a diagram illustrating the structure of a packet which includes voice data in accordance with the present invention.

FIG. 9 is a diagram showing a packet having voice data (hereafter also called a "VOD packet"). The first bit is a SYNC bit that is employed for synchronization. The second bit indicates whether or not GSM coded voice data are included in the packet. When the packet includes voice data, this bit is set to the ON state. The first and second bits comprise the header of the packet. The third through eighth bits is a field for entering a CRC (cyclic redundancy check), i.e., redundant code for voice data. The successive portions are fields for holding actual transfer data, with the ninth through the 272nd bits being allocated for voice data, and the 273rd through 288th bits being allocated for computer data.

Figure 10:
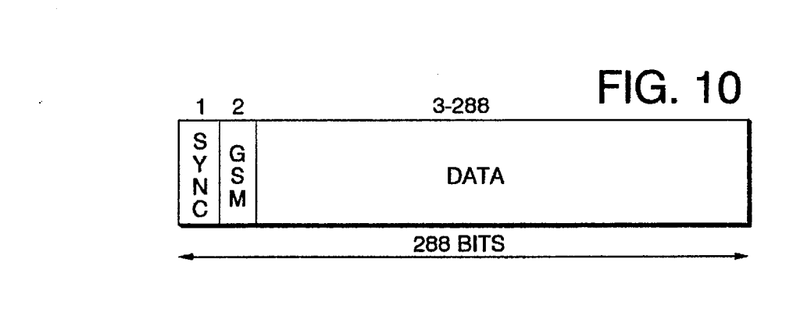
FIG. 10 is a diagram illustrating the structure of a packet which does not include voice data in accordance with the present invention.

FIG. 10 is a diagram showing a packet that has no voice data (hereafter called a "NON VOICE packet"). The first and the second bit comprise the header portion, as in FIG. 9. Since voice data are not included in the packet, the second bit is set to the OFF state. All the remaining third through 288th bits are allocated for computer data.

The gateway manager analyzes the header portion of a received packet and identifies the packet as either a VOD packet that includes voice data or a NON VOICE packet that does not include voice data. When the received packet is found to contain voice data, the packet is demultiplexed into the ninth through 272nd bits and the 273rd through 288th bits, and these data are distributed to the DSP 83 of the internal transmission and reception module 74 and the LAN 52 respectively. When the received packet is found to have no voice data, the third through the 288th bits are transmitted to the LAN 52 only.

6. Telephone System Connection Process by Gateway System 20

The structure of the system 100 has been described above. In this article, the processing of the system 100 and the operation for the control of a telephone system connection by the gateway system 20 will now be explained. The operation differs between when the receipt of an incoming call for an in-house node is requested by a node on the public telephone system 53 and when an outgoing call to a node on the public telephone system 53 is requested by an in-house node.

Figure 11:
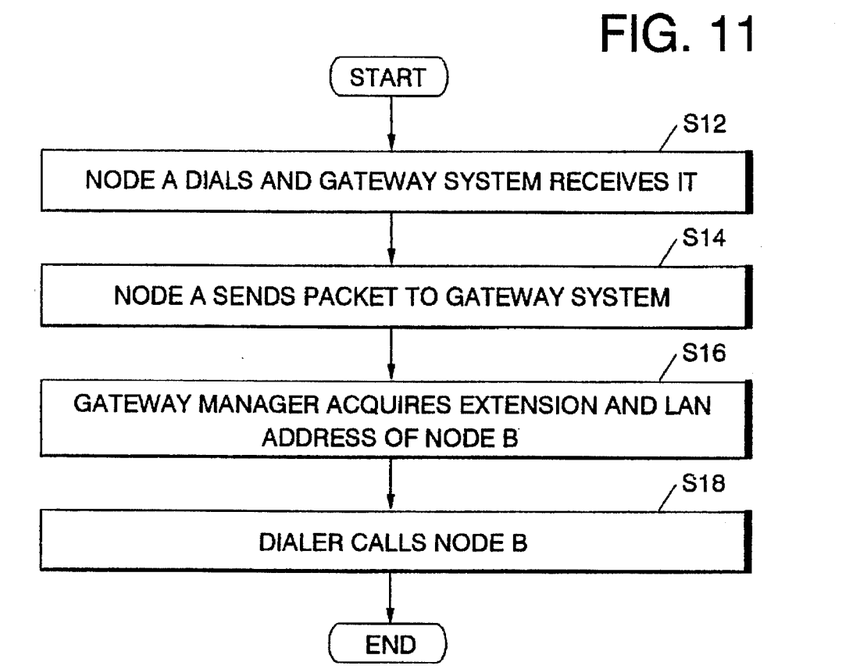
FIG. 11 is a flow chart of a telephone system connection process that the gateway system 20 performs when a node A in a public telephone system 53 transmits a signal to an internal node B.

FIG. 11 is a flow chart showing the operation for the telephone system connection that the gateway system 20 performs when the receipt of an incoming call for in-house node B is requested by node A on the public telephone system 53.

First, when node A dials the telephone number of the gateway system 20, the modem 81 of the gateway system 20 goes to the off-hook state, so that both modems are connected (step S12).

Then, node A transmits to the gateway system 20 a packet that includes its node ID and the node ID for node B, which is the destination (step S14). Since node A is not at this time connected to the extension telephone of node B, a NON VOICE packet that does not include voice data is employed.

The gateway manager acquires the extension number and the MAC address of node B by referring to the address book of the gateway manager (step S16).

The dialer 85 then substitutes for node A and dials the extension number of node B to establish the connection along the private telephone system 51, and to connect the PC of node B to the LAN 52 (step S18).

The physical connection of the PC 54 of node A and the PC 40 of node B is completed, and hereafter connection at the level of the platform layers of the individual PCs is possible. When node A and node B are connected to each other via the gateway system 20 at the level of their platform layers, the nodes can be connected at their Conference User Interfaces and application sharing can be performed. When agreement is established among node A, node B, and the gateway manager, transmission and reception of voice data is also available. In this case, the voice data and the computer data are transmitted bidirectionally (Full Duplex). In consonance with this situation, either the VOD packet or the NON VOICE packet can be employed as needed.

Figure 12:
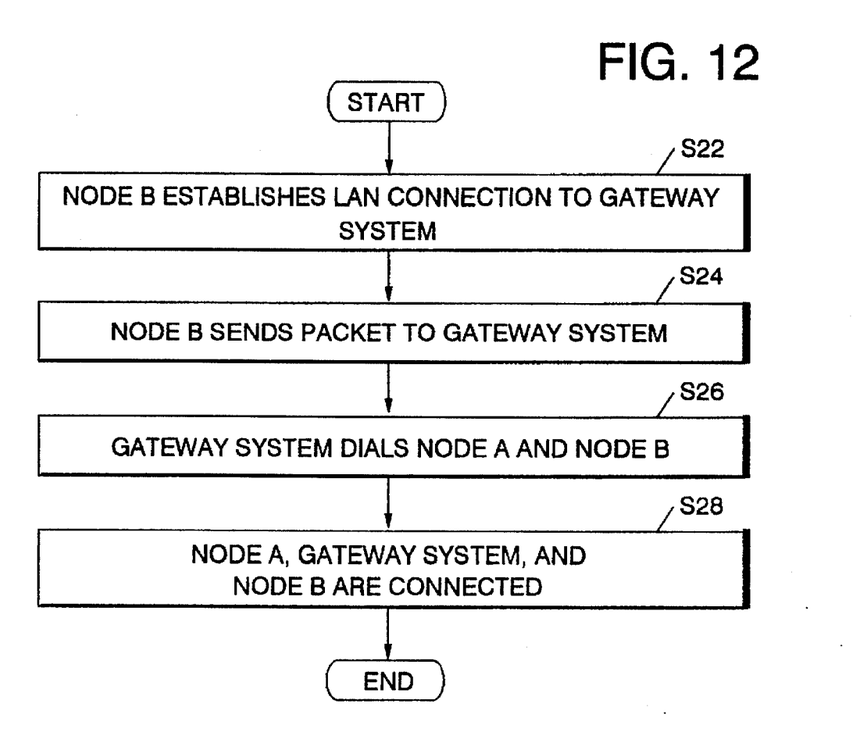
FIG. 12 is a flow chart of a telephone system connection process that the gateway system 20 performs when the internal node B transmits a signal to node A in the public telephone system 53.

FIG. 12 is a flow chart showing the operation for the telephone system connection that the gateway system 20 performs when an outgoing call to node A on the public telephone system 53 is requested by in-house node B. First, node B establishes a LAN connection to the gateway system 20 (step S22). Node B then transmits a packet, which includes its node ID, the node ID and telephone number of node A, the destination, via the LAN 52 to the gateway system 20.

The dialer 85 substitutes for node B and dials node A so that the modem of node A goes to the off-hook state and the gateway system 20 is connected to node A via the modem (step S26). Since voice data is not included at this time, a NON VOICE packet is employed. At the same time, the dialer 85 dials the extension number of node B.

Then, node A, the gateway system 20, and node B are physically connected, and hereafter both nodes can be connected at the level of the platform layers of the PCs (step S28). When nodes A and B are connected via the gateway system 20 at the level of their platform layers, they can also be connected at their Conference User Interfaces, and application sharing can be performed. When agreement is established among node A, node B, and the gateway manager, transmission and reception of voice data is also possible. In this case, the voice data and the computer data are transmitted bidirectionally (Full Duplex). In consonance with the situation, either the VOD packet or the NON VOICE packet can be employed as needed.

That is, a video conference system that utilizes a conventional plain old telephone system (POTS) can be built by merely providing in an office a single system that implements a gateway system or a gateway method according to the present invention. In addition, a user can participate in a video conference just by installing gateway connection software in a PC that is connected to a LAN in an office. Therefore, for example, a consultation, which is held to establish a price between a salesman, who is in a customer's office, and a sales department manager who is in his office, or a remote conference that is held between a main office and a local office, can be easily performed at a low cost. Further, even in offices for which independent LAN and PBX are provided, the equipment that is required for only a single gateway system will permit a video conference to be held via the plain old telephone system.

As described above in detail, according to the present invention, it is possible to hold low cost video conferences in which there are both in-house participants and participants on the public telephone system by employing a PBX and a LAN.

According to the present invention, simply by the in-house provision of a single gateway system (more exactly, a gateway system or a computer system that implements a gateway method) a video conference system can be implemented that uses conventional equipment, such as a POTS. For example, a PBX need only control the connection of calls in consonance with extension telephone numbers, regardless of the presence of the gateway system. The nodes for individual in-house participants of a conference can take part in a video conference by using their extension telephones and their personal computers that are connected to a LAN. The equipment that is required for the use of outside telephone lines by the individual nodes, or the development of an interface that corresponds to the PBX, is not at all required.

While the invention has been particularly shown and described with respect to preferred embodiments thereof, it should be understood by those skilled in the art that the foregoing and other changes in form and detail may be made therein without departing from the spirit and scope of the invention as defined in the appended claims.

What is claimed is:

1. A gateway system, which relays data, via a private branch exchange, to an outside information processing unit on a plain old telephone system and to an information processing unit that is connected to an internal extension telephone system and a LAN, comprising:

a modem for demodulating a packet that is received via said plain old telephone system and for modulating and transmitting a packet to said plain old telephone system, and for dialing an outside telephone line;

multiplex/demultiplex means for multiplexing voice data and computer data to form a packet, and for demultiplexing a packet to acquire voice data and computer data separately;

signal processing means for coding or decoding said voice data;

AD/DA conversion means for performing digital-analog or analog-digital conversion on said voice data;

dial means for dialing an extension line via said private branch exchange; and a LAN adaptor for exchanging computer data via said LAN.

2. A method for controlling a gateway system that relays data, via a private branch exchange, to a node A, to which is allocated a first information processing unit that is connected externally to a plain old telephone system, and to a node B, to which is allocated a second information processing unit that is connected internally to an extension telephone system and a LAN, comprising the steps of:

receiving a call from said node A to said gateway system;

transmitting from said node A to said gateway system a packet that includes identification information for said node B;

acquiring, by said gateway system, an extension telephone number for said node B according to said identification information;

dialing of an extension telephone number for said node B by said gateway system; and establishing a LAN connection between said gateway system and said node B.

3. A method for controlling a gateway system that relays data, via a private branch exchange, to a node A, to which is allocated a first information processing unit that is connected externally to a plain old telephone system, and to a node B, to which is allocated a second information processing unit that is connected internally to an extension telephone system and a LAN, comprising the steps of:

establishing a LAN connection between said node B and said gateway system;

transmitting, via LAN, from said node B to said gateway system a packet that includes a telephone number for said node A;

dialing, by said gateway system, of said telephone number of said node A; and dialing of an extension telephone number for said node B by said gateway system.

4. A method for controlling a gateway system that relays data, via a private branch exchange, to a node A, to which is allocated a first information processing unit that is connected externally to a plain old telephone system, and to a node B, to which is allocated a second information processing unit that is connected internally to an extension telephone system and a LAN, comprising the steps of:

receiving, via said private branch exchange, a packet that is transmitted to said plain old telephone system by said first information processing unit;

demodulating said packet;

demultiplexing the resultant packet to acquire voice data and computer data separately;

decoding and converting said voice data into an analog signal;

transmitting said analog signal via said private branch exchange to an extension telephone for said node B; and transmitting said computer data to said second information processing unit that is LAN-connected.

5. A method for controlling a gateway system that relays data, via a private branch exchange, to a node A, to which is allocated a first information processing unit connected externally to a plain old telephone system, and to a node B, to which is allocated a second information processing unit connected internally to an extension telephone system and a LAN, comprises the steps of:

receiving voice data via said private branch exchange from an extension telephone for said node B;

digitizing and coding said voice data;

receiving computer data via a LAN from said second information processing unit;

multiplexing said voice data that are coded and said computer data to prepare a packet; and modulating and transmitting said packet via said private branch exchange to said first information processing unit.

* * * * *